May 10, 1927.  
G. OHAUS  
WEIGHING SCALE PLATE  
Filed Aug. 6, 1926
1,627,710
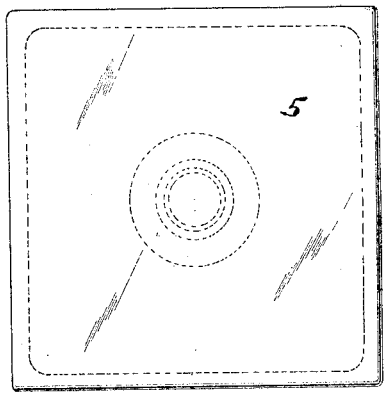
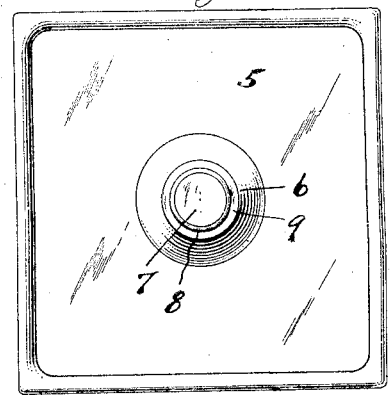
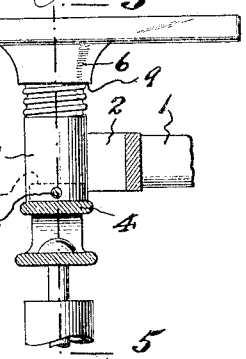
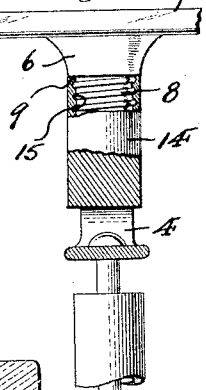
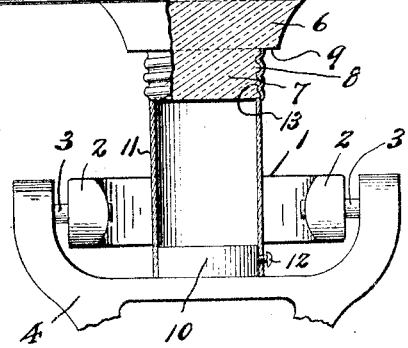
INVENTOR  
Gustav Ohaus  
BY  
Frautzel and Richards  
ATTORNEYS Patented May 10, 1927.

1,627,710

UNITED STATES PATENT OFFICE.

GUSTAV OHAUS, OF MAPLEWOOD, NEW JERSEY.

WEIGHING-SCALE PLATE.

Application filed August 6, 1926. Serial No. 127,516.

This invention relates, generally, to improvements in weighing scales of the so-called counter type; and the same has reference, more particularly, to a novel construction of weighing platform or pan in combination with a novel clampless means for directly coupling said platform or pan with a platform supporting yoke of the scale beam.

In the manufacture of weighing scales or balances equipped with weighing platforms or pans made of glass, vitreous or other molded material, it has been necessary to provide a somewhat complicated arrangement of metallic clamp straps to embrace the platform and furnish a means for connecting the same with a platform supporting yoke of the scale beam. These clamp straps require to be carefully fitted to and assembled with each individual platform with which they are to serve, thus not only entailing additional manufacturing operations with respect to the production of the clamp straps per se, but also adding considerably to the labor cost of assembling the scales, since the operations are in the nature of hand work requiring considerable skill. It is, therefore, the principal object of this invention to provide a novel construction of weighing platform molded from glass, vitreous or other material, having integrally formed therewith a means for coupling the same with the platform supporting yoke of the scale beam, so that not only is the necessity for clamp straps obviated, but the operations of assembling the parts is greatly simplified and cheapened, while nevertheless producing a stronger, neater and more efficient finished structure.

Other objects of this invention, not at this time more particularly enumerated, will be clearly understood from the following detailed description of the same.

The invention is clearly illustrated in the accompanying drawings, in which:—

Fig. 1 is a top plan view of my improved weighing scale platform or pan per se; Fig. 2 is a bottom plan view of the same; and Fig. 3 is a side or edge elevation of the same.

Fig. 4 is a side elevation of the novel scale platform or pan as operatively assembled with and coupled to the platform supporting yoke of the scale beam; the latter element being shown partly in section; and Fig. 5 is an enlarged fragmentary sectional view, taken on line 5—5 in Fig. 4.

Fig. 6 is a fragmentary view, similar to that shown in Fig. 4, but illustrating a somewhat modified form of scale beam and platform or pan coupling arrangement.

Similar characters of reference are employed in all of the above-described views, to indicate corresponding parts.

Referring now to said drawings, the reference character 1 indicates an end of a scale beam of the usual construction provided at each end with a bifurcated portion, the arms 2 of which possess outwardly and laterally projecting pivot studs or knife-edges 3 which pivotally engage and carry the platform supporting yokes 4, which are arranged for vertical reciprocation relative to the scale base when the scale beam is oscillated, all in the manner familiar to those skilled in the art.

The reference character 5 indicates a weighing platform or pan made of molded material, preferably of glass, porcelain or other desired material. The said platform or pan is provided, in a central location for downward projection from its under side, and formed integrally with the body thereof, with a boss 6 having at its extreme end a shank 7 of reduced diameter, with its external surface molded to form external screw threads 8. The reduction of diameter of the shank 7 relative to the boss 6 provides a stop shoulder 9 adjacent to the upper end of the shank.

One form of means for utilizing said threaded shank to operatively couple the platform or pan 5 with a supporting yoke 4 is shown in Figs. 4 and 5 of the drawings, and consists in providing a central upstanding boss 10 in connection with the upper end of said yoke 4. Telescopically fitted over the said boss 10 is the lower end of a tubular sleeve 11, which is secured against displacement by a set screw 12, or other suitable fastening means. The upper end of said sleeve 11 is internally threaded, as at 13, to correspond to the threads 8 of the platform or pan shank 7, and the latter is screwed into the upper end of this sleeve 11, until the stop shoulder 9 abuts the end of the latter, thus securely coupling said platform or pan 5 with the yoke 4. It will be quite evident, that due to the above described novel construction, not only are the operations of securely attaching the platform or pan to the yoke greatly simplified, but also the form of connection is much stronger, less likely to become disarranged, and much cheaper than the heretofore employed clamp straps and similar platform or pan attaching means.

In Fig. 6, I have shown a slightly modified form of means for connecting the platform or pan 5 to the yoke 4. In this arrangement, the yoke 4 is provided with a central upstanding member or arm 14 preferably cast as an integral part of said yoke 4. This member or arm 14 is provided at its upper free end with an internally threaded socket 15 into which the platform or pan shank 7 may be screwed as shown in Fig. 6.

Having thus described my invention, I claim:—

1. A platform or pan for weighing scales, comprising a molded body of glass, having integrally formed in connection with its under side a centrally disposed downwardly directed externally threaded shank for the purposes described.

2. In combination with a weighing scale beam having a platform supporting yoke, a weighing platform of molded material having integrally formed in connection with its under side an externally threaded downwardly directed shank, and said platform supporting yoke having means provided with an internally threaded portion to receive said shank, to thereby couple said platform operatively therewith.

3. In combination with a weighing scale beam having a platform supporting yoke, a weighing platform of molded glass, said platform having integrally formed at its under side a central boss terminating in an externally threaded shank of reduced diameter, and said platform supporting yoke having means provided with an internally threaded portion to receive said shank, to thereby couple said platform operatively therewith.

In testimony, that I claim the invention set forth above I have hereunto set my hand this 3rd day of August, 1926.

GUSTAV OHAUS.